US012566476B1

(12) United States Patent
Xia

(10) Patent No.: US 12,566,476 B1
(45) Date of Patent: Mar. 3, 2026

(54) THREE-SCREEN SPLITTER

(71) Applicant: Gongjun Xia, Anhui Province (CN)

(72) Inventor: Gongjun Xia, Anhui Province (CN)

( * ) Notice: Subject to any disclaimer, the term of this patent is extended or adjusted under 35 U.S.C. 154(b) by 0 days.

(21) Appl. No.: 19/028,239

(22) Filed: Jan. 17, 2025

(30) Foreign Application Priority Data

Jan. 10, 2025 (CN) .......................... 202510048021.9

(51) Int. Cl.
*G09G 5/00* (2006.01)
*G06F 1/16* (2006.01)

(52) U.S. Cl.
CPC ............ *G06F 1/166* (2013.01); *G06F 1/1647* (2013.01)

(58) Field of Classification Search
CPC .... G06F 1/1613; G06F 1/1615; G06F 1/1616; G06F 1/1618; G06F 1/1647; G06F 1/166; G06F 3/1446; H05K 5/0204
See application file for complete search history.

(56) References Cited

U.S. PATENT DOCUMENTS

| | | | | |
|---|---|---|---|---|
| 12,333,204 | B1 * | 6/2025 | Xia ...................... | H05K 5/0204 |
| 2013/0334376 | A1 * | 12/2013 | Moscovitch ........... | F16M 11/00 |
| | | | | 248/125.1 |
| 2019/0018453 | A1 * | 1/2019 | Rhodes ................. | G06F 1/1647 |
| 2021/0286408 | A1 * | 9/2021 | Chueh .................. | H05K 5/0226 |
| 2023/0333597 | A1 * | 10/2023 | Bustamante .......... | G06F 1/1647 |
| 2024/0397640 | A1 * | 11/2024 | Hyun ................... | G06F 1/1681 |
| 2025/0071917 | A1 * | 2/2025 | Choi .................... | H05K 5/0247 |
| 2025/0355463 | A1 * | 11/2025 | Wang ................... | F16M 11/18 |

* cited by examiner

*Primary Examiner* — Joe H Cheng

(57) ABSTRACT

A three-screen splitter includes a first screen, a second screen, a third screen, and a first bracket. The first screen is rotatably connected to one end of the second screen, the third screen is rotatably connected to the other end of the second screen, and the first bracket is connected to the second screen. The first bracket includes a main plate, an accessory plate, and a supporting plate. The main plate is fixedly connected to the second screen, one end of the accessory plate is rotatably connected to the main plate, and the other end of the accessory plate is rotatably connected to the supporting plate. The three-screen splitter can suspend freely, the display heights and angles of the screens can be adjusted, the strength and stability of the bracket are guaranteed, and the demand for freely selecting a comfortable angle is met.

9 Claims, 5 Drawing Sheets

THREE-SCREEN SPLITTER

CROSS-REFERENCE TO RELATED APPLICATIONS

The application claims priority of Chinese patent application CN202510048021.9, filed on Jan. 10, 2025, which is incorporated herein by reference in its entireties.

BACKGROUND OF THE INVENTION

1. Technical Field

The present disclosure relates to the technical field of splitters, and particularly relates to a three-screen splitter.

2. Description of Related Art

At present, most existing splitters on the current market use a single screen or double screens with a small support frame or a small bracket. Moreover, most splitters use a 45° supporting structure. In actual use, the display angle is limited, users get fatigued easily; the comfortable angle cannot be selected freely, and the splitters can only be placed on the left and right sides of a computer and cannot display above the computer, so that the experience is poor.

BRIEF SUMMARY OF THE INVENTION

The present disclosure provides a three-screen splitter, which solves the problem in existing splitters.

In order to achieve the above objective, the present disclosure provides the following technical solution: a three-screen splitter includes a first screen 1, a second screen 2, a third screen 3, and a first bracket 4; the first screen 1 is rotatably connected to one end of the second screen 2, the third screen 3 is rotatably connected to the other end of the second screen 2, and the first bracket 4 is connected to the second screen 2; the first bracket 4 includes a main plate 41, an accessory plate 42, and a supporting plate 43; the main plate 41 is fixedly connected to the second screen 2, one end of the accessory plate 42 is rotatably connected to the main plate 41, and the other end of the accessory plate 42 is rotatably connected to the supporting plate 43; and the accessory plate 42 includes a second connecting part 421 and a third connecting part 422, where a stretching part 423 is arranged on the second connecting part 421, a stretching groove 424 is formed in the third connecting part 422, and the stretching part 423 is movably clamped in the stretching groove 424.

Preferably, the three-screen splitter includes a first rotating shaft 5, wherein a first through-hole 53 is formed in the first rotating shaft 5; one end of the accessory plate 42 is rotatably connected to the main plate 41 through the first rotating shaft 5, the other end of the accessory plate 42 is rotatably connected to the supporting plate 43 through the first rotating shaft 5, and the main plate 41 is rotatably connected to the second screen 2 through the first rotating shaft 5; and one end of the accessory plate 42 is communicated with the main plate 41 through the first through-hole 53, the other end of the accessory plate 42 is communicated with the supporting plate 43 through the first through-hole 53, and the main plate 41 is communicated with the second screen 2 through the first through-hole 53.

Preferably, the three-screen splitter includes a second rotating shaft 6, wherein a second through-hole 61 is formed in the second rotating shaft 6, a first groove 11 is formed in a right end of the first screen 1, a second groove 21 is formed in a left end of the second screen 2, a third groove 22 is formed in a right end of the second screen 2, and a fourth groove 31 is formed in a left end of the third screen 3; the first groove 11 is connected to the second groove 21 through the second rotating shaft 6, and the third groove 22 is connected to the fourth groove 31 through the second rotating shaft 6; and the first screen 1 is communicated with the second screen 2 through the second through-hole 61, and the second screen 2 is communicated with the third screen 3 through the second through-hole 61.

Preferably, a fourth connecting part 425 and a spring 426 are arranged in the stretching groove 424, a left side of the fourth connecting part 425 is connected to a right side of the spring 426, the right side of the spring 426 abuts against a side wall of the stretching part 423, a rightward first hook 427 is arranged above the fourth connecting part 425, and a leftward second hook 428, corresponding to the first hook 427, is arranged below the stretching part 423; and a first bump 429 is arranged in front of the fourth connecting part 425, a fifth groove 430, corresponding to the first bump 429, is formed in front of the third connecting part 422, and the first bump 429 is movably arranged in the fifth groove 430.

Preferably, a clockwork spring 431 is arranged in the stretching groove 424, and the clockwork spring 431 is connected to the stretching part 423.

Preferably, silicon steel is arranged on the stretching part 423.

Preferably, a handle 432 is arranged in front of the supporting plate 43.

Preferably, a second bracket 433 is rotatably arranged above the supporting plate 43, and a supporting groove 434 is formed behind the accessory plate 42.

Preferably, a storage limiting buckle 21 is arranged above the second screen 2.

By implementing the above technical solution, the present disclosure has the following beneficial effects: the three-screen splitter can suspend freely, the display heights and angles of the screens can be adjusted, the strength and stability of the bracket are guaranteed, the demand for freely selecting a comfortable angle is met, and the using convenience and practicality are improved.

DETAILED DESCRIPTION OF THE INVENTION

To better understand the technical solution of the present disclosure, the embodiments provided by the present disclosure will be described in detail below in conjunction with drawings.

Figure 1:
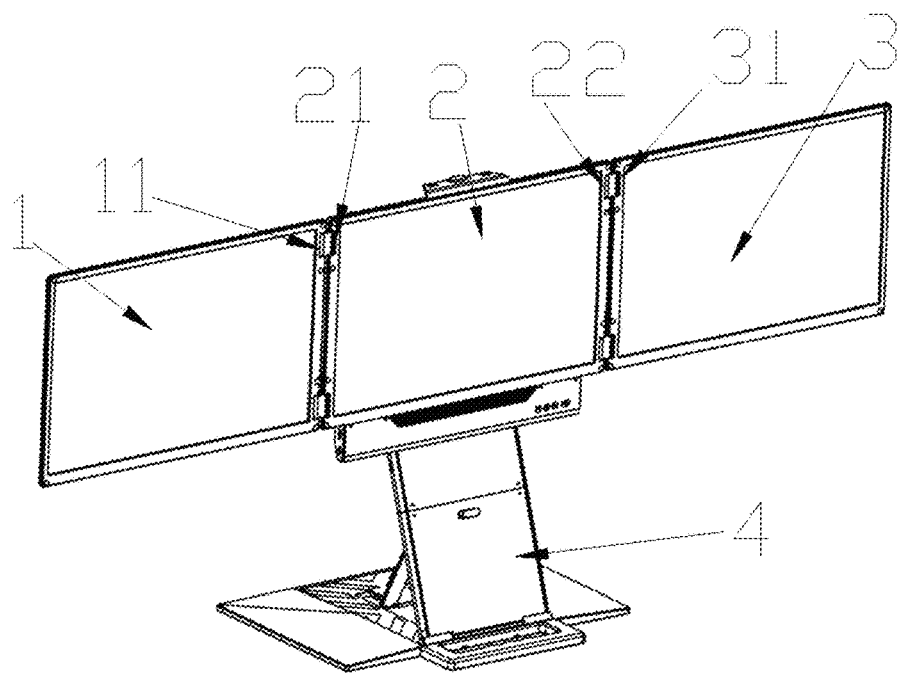
FIG. 1 is an overall structural stereogram of a three-screen splitter provided by the present disclosure.
Figure 2:
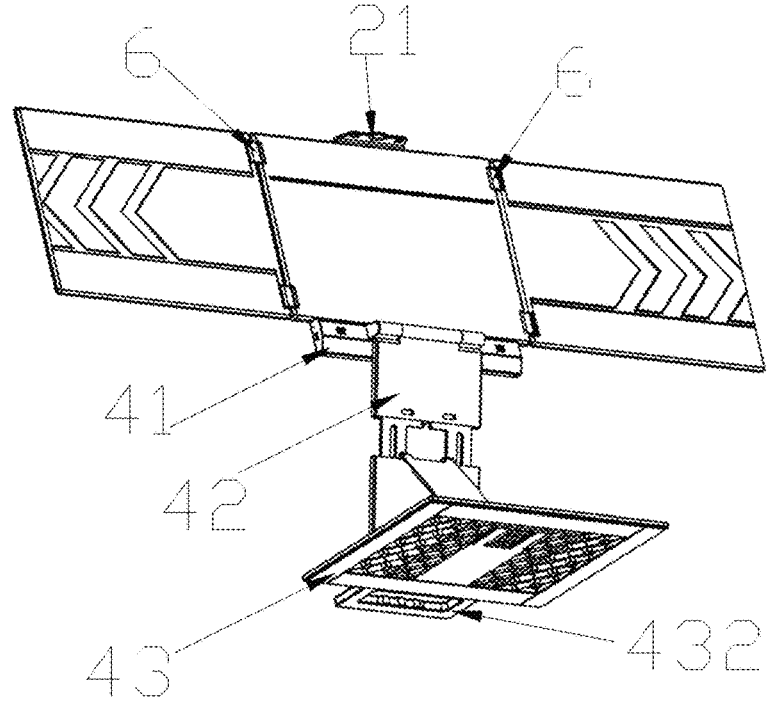
FIG. 2 is an overall structural stereogram of a three-screen splitter provided by the present disclosure.
Figure 3:
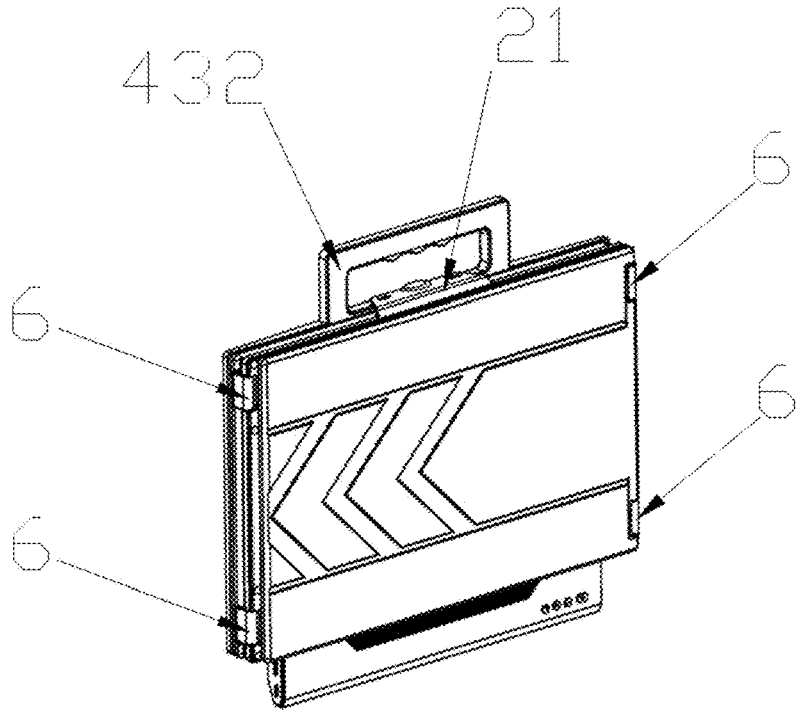
FIG. 3 is an overall structural stereogram of a three-screen splitter provided by the present disclosure.
Figure 4:
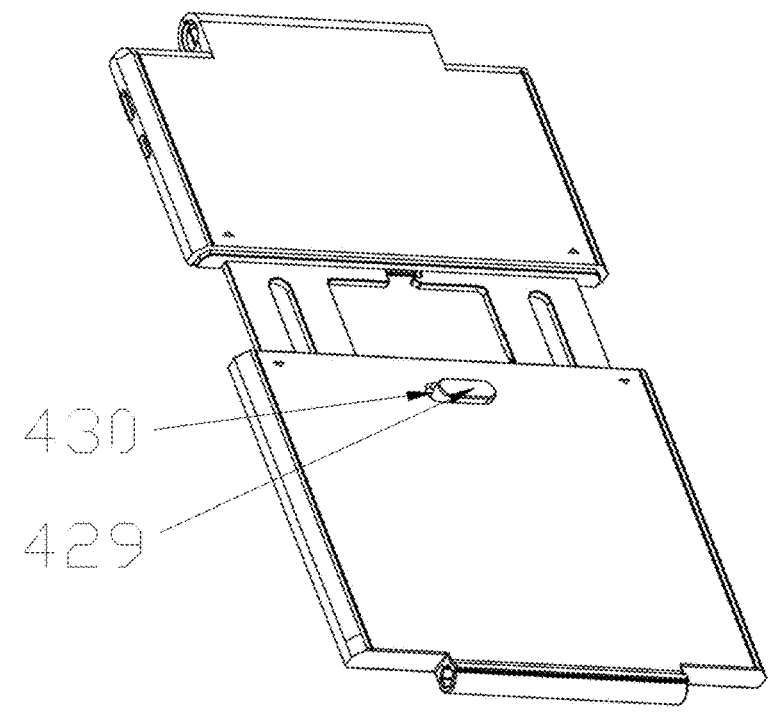
FIG. 4 is a partially enlarged structural stereogram of a three-screen splitter provided by the present disclosure.
Figure 5:
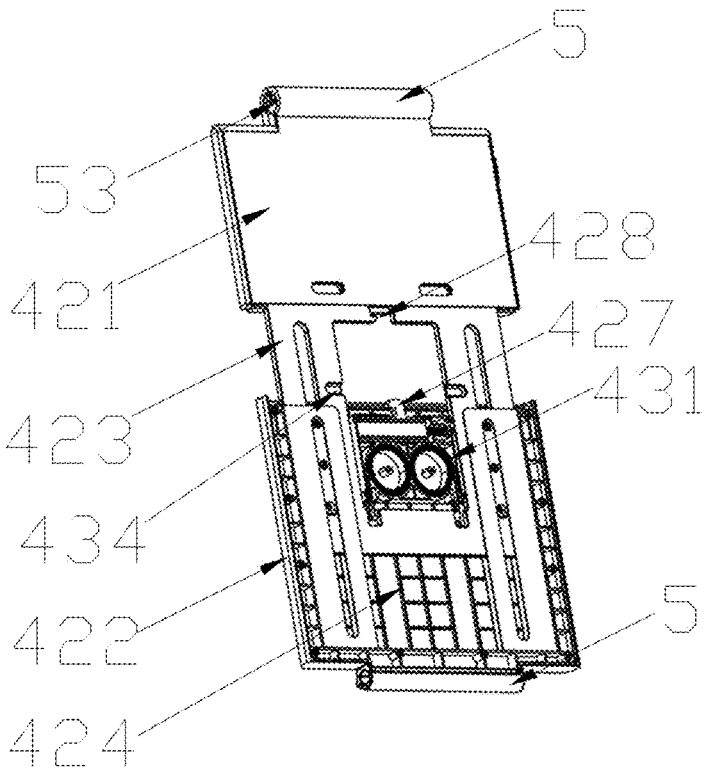
FIG. 5 is a partially enlarged structural stereogram of a three-screen splitter provided by the present disclosure.
Figure 6:
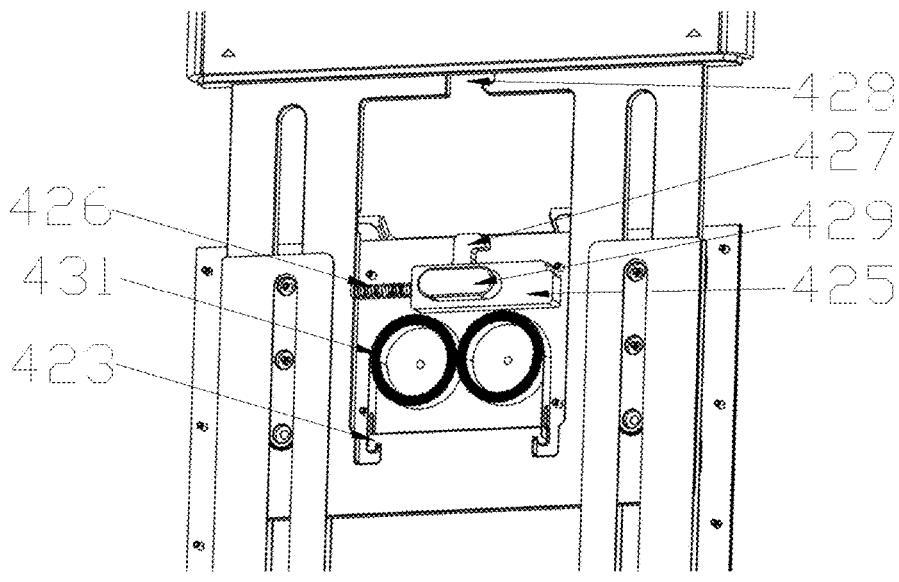
FIG. 6 is a partially enlarged structural stereogram of a three-screen splitter provided by the present disclosure.
Figure 7:
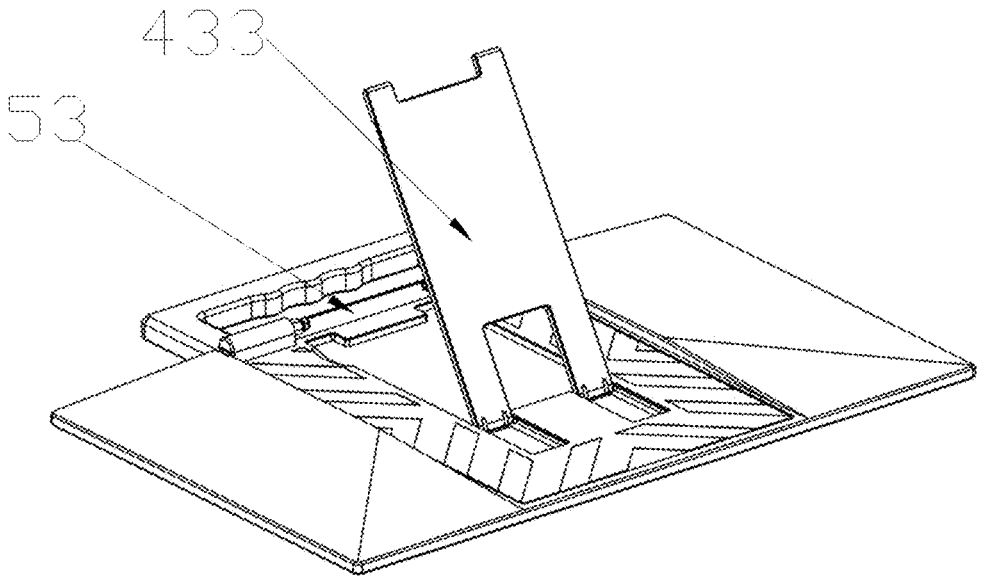
FIG. 7 is a partially enlarged structural stereogram of a three-screen splitter provided by the present disclosure.
Figure 8:
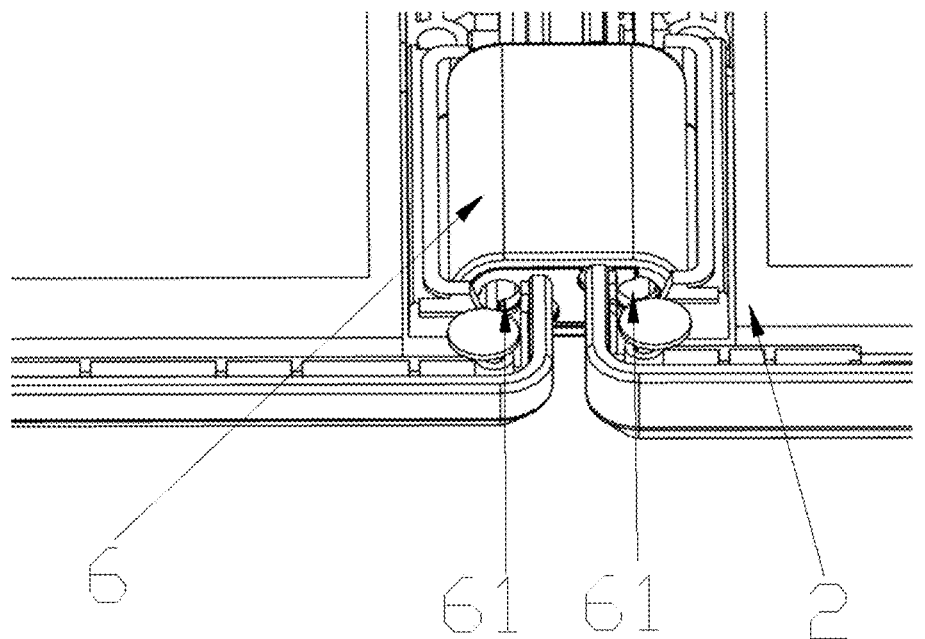
FIG. 8 is a partially enlarged structural stereogram of a three-screen splitter provided by the present disclosure.
Figure 9:
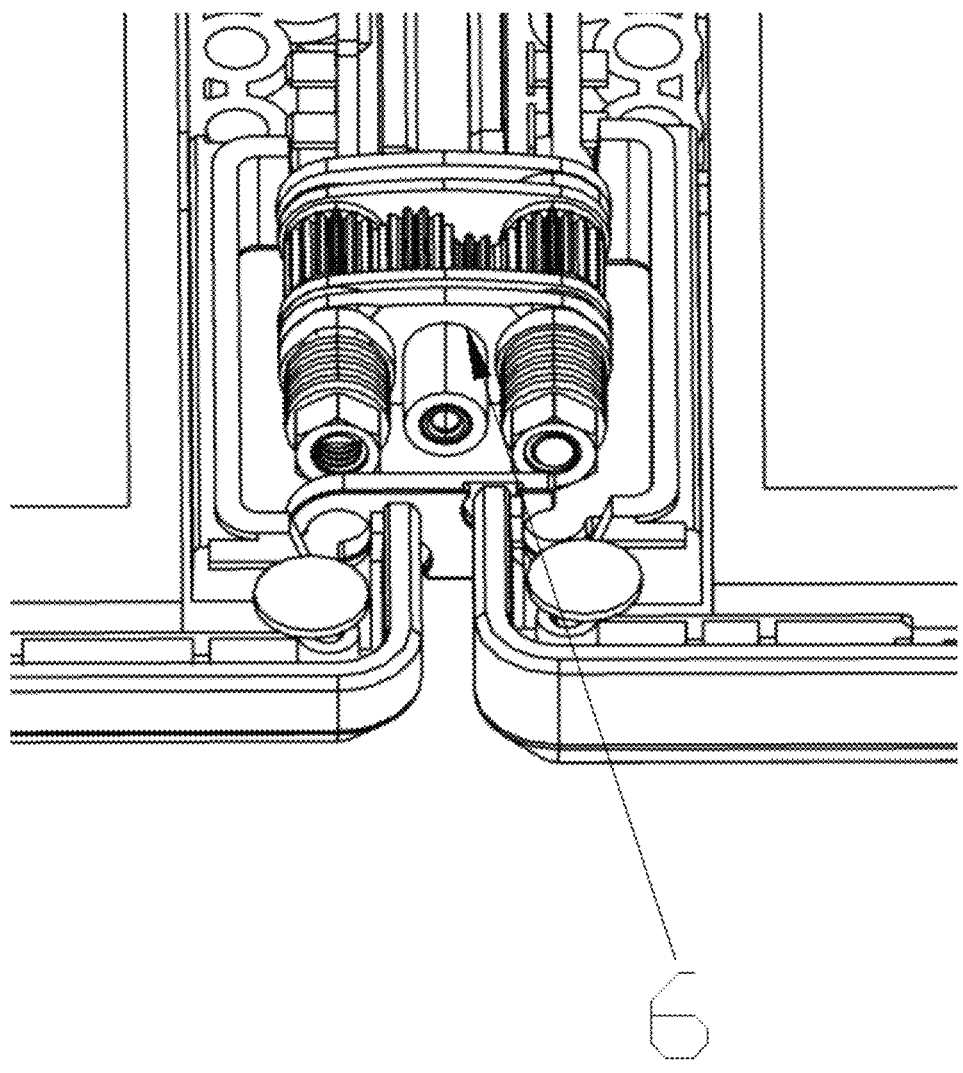
FIG. 9 is a partially enlarged structural stereogram of a three-screen splitter provided by the present disclosure.

As shown in FIGS. 1-9, it may be understood that this embodiment provides a three-screen splitter, including a first screen 1, a second screen 2, a third screen 3, and a first bracket 4; the first screen 1 is rotatably connected to one end of the second screen 2, the third screen 3 is rotatably connected to the other end of the second screen 2, and the first bracket 4 is connected to the second screen 2; the first bracket 4 includes a main plate 41, an accessory plate 42, and a supporting plate 43; the main plate 41 is fixedly connected to the second screen 2, one end of the accessory plate 42 is rotatably connected to the main plate 41, and the other end of the accessory plate 42 is rotatably connected to the supporting plate 43; and the accessory plate 42 includes a second connecting part 421 and a third connecting part 422, wherein a stretching part 423 is arranged on the second connecting part 421, a stretching groove 424 is formed in the third connecting part 422, and the stretching part 423 is movably clamped in the stretching groove 424.

In the embodiment, in use, the three screens are transversely opened to enlarge the area of the display screen, and the first bracket is opened. The main plate, the accessory plate, and the supporting plate form a triangular structure capable of realizing stable supporting. By changing the position of the stretching part in the stretching groove, the height of the product is adjusted to meet the using requirements of different users with different heights and using quantity of the screens, the product can suspend freely, and the display heights and angles of the screens can be adjusted, so that the strength and stability of the bracket are guaranteed; when the product is stored, one surface of the supporting plate is adhered to the accessory plate by rotation, then the accessory plate rotates relative to the second screen, so that the other surface of the supporting plate is adhered to and locked on the back surface of the second screen, thus guaranteeing the stability of the product in the stored state; in addition, the first screen and the third screen are stored and adhered to the second screen in sequence, so that the product has a small size and is easy to store and transport, and the using convenience and practicality are improved; the main plate is internally provided with a circuit board, and the circuit board is electrically connected to the display screens; and by changing the position of the stretching part in the stretching groove, the using height is changed, so that users can adjust the screens according to their requirements, and the usage experience of the users is improved.

In Embodiment II, further, the three-screen splitter includes a first rotating shaft 5, wherein a first through-hole 53 is formed in the first rotating shaft 5; one end of the accessory plate 42 is rotatably connected to the main plate 41 through the first rotating shaft 5, the other end of the accessory plate 42 is rotatably connected to the supporting plate 43 through the first rotating shaft 5, and the main plate 41 is rotatably connected to the second screen 2 through the first rotating shaft 5; and one end of the accessory plate 42 is communicated with the main plate 41 through the first through-hole 53, the other end of the accessory plate 42 is communicated with the supporting plate 43 through the first through-hole 53, and the main plate 41 is communicated with the second screen 2 through the first through-hole 53. Since the middle of the first rotating shaft 5 and the integrated structure except for the middle rotate the middle of the first rotating shaft rotate relatively, a first structure and a second structure respectively connected to the two parts of the first rotating shaft 5 are rotatably connected; through the through-hole formed between the two parts of the first rotating shaft 5, i.e., the first through-hole 53, the first structure and the second structure respectively connected to the two parts of the first rotating shaft 5 may be wired through the first through-hole 53, so that the function of electrical connection of hidden wires is realized, and the aesthetics is improved.

Based on the above embodiments, further, the three-screen splitter includes a second rotating shaft 6, wherein a second through-hole 61 is formed in the second rotating shaft 6, a first groove 11 is formed in a right end of the first screen 1, a second groove 21 is formed in a left end of the second screen 2, a third groove 22 is formed in a right end of the second screen 2, and a fourth groove 31 is formed in a left end of the third screen 3; the first groove 11 is connected to the second groove 21 through the second rotating shaft 6, and the third groove 22 is connected to the fourth groove 31 through the second rotating shaft 6; and the first screen 1 is communicated with the second screen 2 through the second through-hole 61, and the second screen 2 is communicated with the third screen 3 through the second through-hole 61. By arranging the second rotating shaft 6 as thick as the screens between the two screens, a first structure and a second structure respectively connected to the left and right parts of the second rotating shaft 6 are rotatably connected; through the through-hole formed between the two parts of the second rotating shaft 6 itself, i.e., the second through-hole 61, the two screens respectively connected to the left and right parts of the second rotating shaft 6 may be wired through the first through-hole 61, so that the function of electrical connection of hidden wires is realized, and the aesthetics is improved.

Based on the above embodiments, further, a fourth connecting part 425 and a spring 426 are arranged in the stretching groove 424, a left side of the fourth connecting part 425 is connected to a right side of the spring 426, the right side of the spring 426 abuts against a side wall of the stretching part 423, a rightward first hook 427 is arranged above the fourth connecting part 425, and a leftward second hook 428, corresponding to the first hook 427, is arranged below the stretching part 423; and a first bump 429 is arranged in front of the fourth connecting part 425, a fifth groove 430, corresponding to the first bump 429, is formed in front of the third connecting part 422, and the first bump 429 is movably arranged in the fifth groove 430. When the product is not used, the stretching part 423 is completely stored in the stretching groove 424; the spring 426 provides an elastic force to the fourth connecting part 425, and the first hook 427 is stably clamped on the second hook 428; and when the product is used, by changing the position of the first bump 429 in the fifth groove 430, the first hook 427 is controlled to be separated from the second hook 428, and then the stretching part 423 may be pulled out from the stretching groove 424, so that the product is stably stored and easy to use.

Based on the above embodiments, further, a clockwork spring 431 is arranged in the stretching groove 424, and the clockwork spring 431 is connected to the stretching part 423. When the stretching part 423 stretches relative to the stretching groove 424, the clockwork spring 431 may provide a stable acting force equal to the magnitudes of gravities of the first screen 1, the second screen 2, the third screen 3, the main plate 41, and the stretching part 423 and opposite to the same in direction thereto. The stretching part 423 may suspend stably at any position relative to the stretching groove 424, so that users select the using height according to their demands conveniently, and therefore, the usage experience of the users is improved.

Based on the above embodiments, further, silicon steel is arranged on the stretching part 423. When the stretching part 423 stretches relative to the stretching groove 424, the hand feeling of the user may be improved. When the product is fixed for use, the using stability of the product may be improved.

Based on the above embodiments, further, a handle 432 is arranged in front of the supporting plate 43. After the product is completely stored, the product may be lifted to move, so that the using environment of the product is diversified, and the usage experience of users is improved.

Based on the above embodiments, further, a second bracket 433 is rotatably arranged above the supporting plate 43, and a supporting groove 434 is formed behind the accessory plate 42. In use, one end of the second bracket 433 is rotatably connected to the supporting plate and the other end of the second bracket may abut against the supporting groove 434 to form a stable triangular supporting structure to improve the using stability of the product, so that the usage experience of users is further improved; and when not used, the second bracket 433 is stored in the supporting groove 434, so that the space occupied by the product is reduced and the space utilization rate is improved.

Based on the above embodiments, further, a storage limiting buckle 21 is arranged above the second screen 2. When the product stored, one surface of the supporting plate is adhered to the accessory plate by rotation, and then the accessory plate rotates relative to the second screen, so that the other surface of the supporting plate is adhered to the back surface of the second screen. Then the storage limiting buckle 21 and the supporting plate are buckled to limit the position of the first bracket, so that the stability of the stored state is guaranteed, and the usage experience of users is improved.

The three-screen splitter provided by the embodiment of the present disclosure is introduced in detail above. For those skilled in the art, there will be changes in the specific implementation and the application scope according to the idea of the embodiments of the present disclosure. In conclusion, the content of the specification shall not be construed as a limitation to the present disclosure.

What is claimed is:

1. A three-screen splitter, comprising a first screen (1), a second screen (2), a third screen (3), and a first bracket (4), wherein the first screen (1) is rotatably connected to one end of the second screen (2), the third screen (3) is rotatably connected to the other end of the second screen (2), and the first bracket (4) is connected to the second screen (2);

the first bracket (4) comprises a main plate (41), an accessory plate (42), and a supporting plate (43), wherein the main plate (41) is fixedly connected to the second screen (2), one end of the accessory plate (42) is rotatably connected to the main plate (41), and the other end of the accessory plate (42) is rotatably connected to the supporting plate (43); and the accessory plate (42) comprises a second connecting part (421) and a third connecting part (422), wherein a stretching part (423) is arranged on the second connecting part (421), a stretching groove (424) is formed in the third connecting part (422), and the stretching part (423) is movably clamped in the stretching groove (424).

2. The three-screen splitter according to claim 1, comprising a first rotating shaft (5), wherein a first through-hole (53) is formed in the first rotating shaft (5);

one end of the accessory plate (42) is rotatably connected to the main plate (41) through the first rotating shaft (5), the other end of the accessory plate (42) is rotatably connected to the supporting plate (43) through the first rotating shaft (5), and the main plate (41) is rotatably connected to the second screen (2) through the first rotating shaft (5); and one end of the accessory plate (42) is communicated with the main plate (41) through the first through-hole (53), the other end of the accessory plate (42) is communicated with the supporting plate (43) through the first through-hole (53), and the main plate (41) is communicated with the second screen (2) through the first through-hole (53).

3. The three-screen splitter according to claim 1, comprising a second rotating shaft (6), wherein a second through-hole (61) is formed in the second rotating shaft (6), a first groove (11) is formed in a right end of the first screen (1), a second groove (21) is formed in a left end of the second screen (2), a third groove (22) is formed in a right end of the second screen (2), and a fourth groove (31) is formed in a left end of the third screen (3);

the first groove (11) is connected to the second groove (21) through the second rotating shaft (6), and the third groove (22) is connected to the fourth groove (31) through the second rotating shaft (6); and the first screen (1) is communicated with the second screen (2) through the second through-hole (61), and the second screen (2) is communicated with the third screen (3) through the second through-hole (61).

4. The three-screen splitter according to claim 1, wherein a fourth connecting part (425) and a spring (426) are arranged in the stretching groove (424), a left side of the fourth connecting part (425) is connected to a right side of the spring (426), the right side of the spring (426) abuts against a side wall of the stretching part (423), a rightward first hook (427) is arranged above the fourth connecting part (425), and a leftward second hook (428), corresponding to the first hook (427), is arranged below the stretching part (423); and a first bump (429) is arranged in front of the fourth connecting part (425), a fifth groove (430), corresponding to the first bump (429), is formed in front of the third connecting part (422), and the first bump (429) is movably arranged in the fifth groove (430).

5. The three-screen splitter according to claim 4, wherein a clockwork spring (431) is arranged in the stretching groove (424), and the clockwork spring (431) is connected to the stretching part (423).

6. The three-screen splitter according to claim 4, wherein silicon steel is arranged on the stretching part (423).

7. The three-screen splitter according to claim 1, wherein a handle (432) is arranged in front of the supporting plate (43).

8. The three-screen splitter according to claim 1, wherein a second bracket (433) is rotatably arranged above the supporting plate (43), and a supporting groove (434) is formed behind the accessory plate (42).

9. The three-screen splitter according to claim 1, wherein a storage limiting buckle (21) is arranged above the second screen (2).

* * * * *